Nov. 29, 1955  M. MENNESSON  2,725,111
MOUNTING OF BICYCLE AUXILIARY ENGINE HAVING DRIVE ROLLER
Filed April 27, 1953
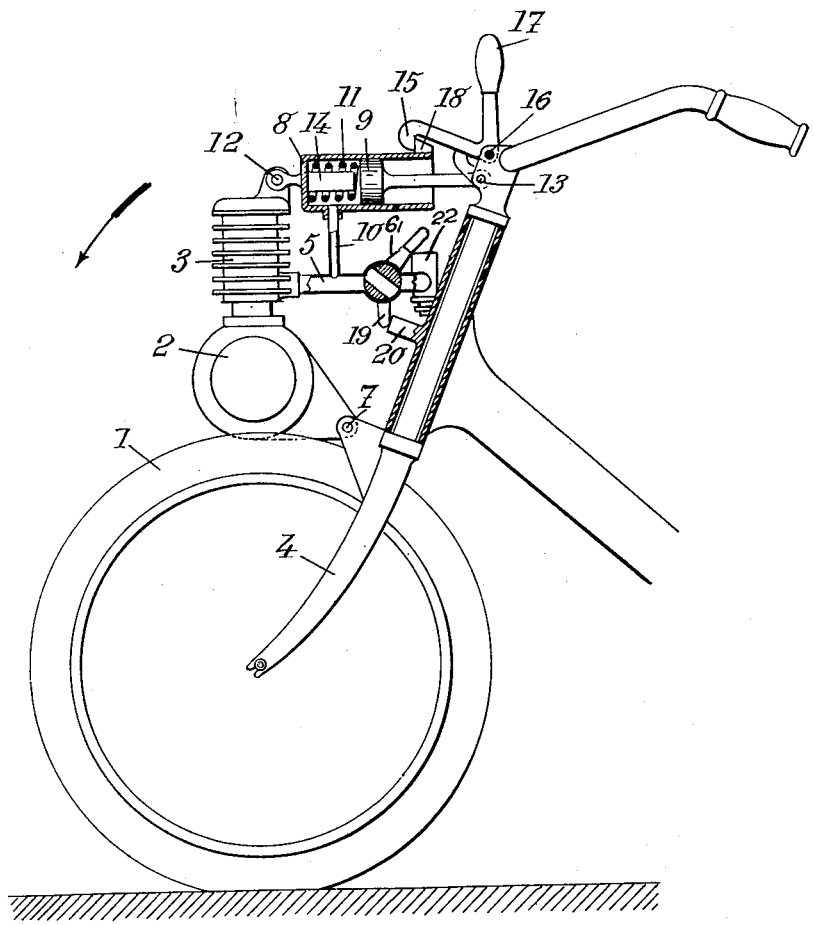
INVENTOR:
MARCEL MENNESSON
BY
Bailey, Stephens & Huettig
ATTORNEYS United States Patent Office 2,725,111
Patented Nov. 29, 1955

2,725,111

MOUNTING OF BICYCLE AUXILIARY ENGINE HAVING DRIVE ROLLER

Marcel Mennesson, Neuilly-sur-Seine, France, assignor to Societe d'Appareils de Controle et d'Equipment des Moteurs (S. A. C. E. M.)

Application April 27, 1953, Serial No. 351,198

Claims priority, application France May 26, 1952

7 Claims. (Cl. 180—31)

The present invention relates to light vehicles at least one wheel of which is driven by means of a roller rotating in contact with the tire of said wheel, and it is more especially although not exclusively concerned with bicycles having an auxiliary engine and still more especially with bicycles the front wheel of which is thus driven by an engine supported by the front fork of the bicycle.

Its object is to provide a vehicle of this type which is better adapted to meet the requirements of practice than those used up to the present time.

It is known to mount the support of such a driving roller on the vehicle frame in such manner that said roller can be moved with respect to the vehicle driving wheel between a driving position and a neutral position. According to my invention, I interpose, between said support and the frame, means responsive to variations of the suction existing in the induction pipe of the engine downstream of the throttle thereof for bringing said roller into its neutral position when this suction exceeds a given value.

A preferred embodiment of my invention will be hereinafter described with reference to the accompanying drawing, given merely by way of example, and in which:

The only figure is a diagrammatic side view, with parts in section, of the front part of a bicycle provided with an auxiliary engine made according to my invention.

The bicycle shown by the drawing has its front wheel 1 driven by a roller 2 supported and driven by an internal combustion engine 3, this engine being itself supported by the front fork 4 of said bicycle. Engine 3 is supplied with fuel mixture by a carburetor 22.

Engine 3 is connected to fork 4 in such manner that the roller 2 carried by said engine can be moved with respect to wheel 1 between a driving position for which the roller is applied against the tire of said wheel and a neutral position where this roller does not contact said tire.

On the other hand, I interpose, between said engine and said fork, means responsive to variations of the suction existing in the induction pipe 5 of the engine downstream of throttle 6 for bringing said roller into neutral position when this suction exceeds a given value.

For this purpose, for instance, as shown by the drawing, the engine is connected to the fork through a pivot axis 7 carried by the top of said fork, whereby, as shown, the engine and its roller can pivot around said axis sufficiently to be brought from active position into neutral position, and vice versa.

I interpose, between a point of the engine remote from said axis 7, such for instance as the cylinder head of said engine, and a suitable point of the fork, for instance the rod carrying the handlebar, a system including a cylinder 8 and a piston 9 the variable volume chamber of which is connected through a tube 10, preferably a flexible tube, with induction pipe 5 downstream of throttle 6.

Thus, under the effect of the suction existing in pipe 5, the roller tends to be moved away from wheel 1. A spring 11, which may be inserted between piston 9 and the end of cylinder 8, urges on the contrary said roller toward said wheel. Cylinder 8 may be pivoted to the engine cylinder about an axis 12, whereas the rod of piston 9 is pivotally connected to the handlebar tube about an axis 13.

It will be readily understood that, with such an arrangement, if the elements of the mechanism are suitably made and dimensioned, the driver will be able to bring the roller into neutral position by closing throttle 6, at least partly. Advantageously, an abutment 14 is provided, for instance inside cylinder 8, to limit the pivoting displacement of the engine toward the neutral position thereof.

Preferably, the above described mechanism will be combined with a device for automatically holding the engine in neutral position.

Such a device includes a lever provided with a hook 15 and pivoted to the handlebar about an axis 16 and provided with a handle 17 to be actuated by the driver.

A lug 18, rigid with cylinder 8 and with the engine, is adapted to cooperate with hook 15 and to remain engaged therewith as long as the driver does not act in the desired direction on handle 17.

Such a device will work as follows:

In normal working position, when throttle 6 (which is actuated through suitable operating means, such as a handle 6₁) is open, the suction existing in pipe 5 is low and spring 11 pushes the top of the engine frontwardly, in the direction of the arrow shown by the drawing, so as to apply roller 2 upon wheel 1, thus adding its action to that of the weight of the engine.

When the driver wishes to stop the action of the engine, he merely closes throttle 6, which causes an increase of the suction downstream of said throttle. For a given value of this suction, piston 9 is sucked in into cylinder 8 against the action of spring 11, and the engine pivots about axis 7 into neutral position.

At the end of this swinging movement of the engine, lug 18 engages under hook 15, which positively keeps it in neutral position, which it can leave only when the driver, acting upon lever 17, disengages hook 15 from lug 18.

According to a supplementary feature of my invention, means are provided whereby, when the driving roller is in neutral position, opening of the throttle is limited to a predetermined maximum value.

For this purpose, I fix on the axis of oscillation of throttle 6 a finger 19 adapted, when the engine is in neutral position, to be held back by an abutment 20, carried for instance by the steering tube 21 of the bicycle, in the position, shown by the drawing, corresponding to the maximum throttle opening that can be admitted for neutral position of the engine.

Thus, as long as lug 18 is in engagement with hook 15, the opening of the gas throttle cannot exceed a predetermined maximum and the driver cannot race his engine. On the contrary, as soon as the engine returns into wheel driving position, the driver can again open the throttle as much as he deems it necessary.

My invention should be considered as also including the case where there are several driving rollers to cooperate with the same wheel, and that where, for instance in a tricycle, several vehicle wheels are to be driven by driving rollers.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In a cycle, a frame, a front wheel, a fork for said wheel pivotable in said frame, a tire on said wheel, a driving unit supported by said fork pivotally about a horizontal axis parallel to the axis of said wheel, said driving unit including an internal combustion engine and a roller driven by said engine and having its axis fixed with respect thereto so as to cooperate with said tire to drive said wheel for a given position of said unit, and to be out of contact with said tire for another position of said unit, a cylinder and piston unit mounted to form a link between said fork and a part of said driving unit remote from the axis about which said driving unit is pivoted to said fork, an induction pipe for said engine, and a throttle in said induction pipe, the variable volume chamber formed in said cylinder between the end thereof and said piston being directly and permanently connected to said induction pipe downstream of said throttle whereby a sufficiently high suction in the portion of said induction pipe downstream of said throttle will draw said piston toward said end of said cylinder, thus causing said driving unit to pivot into said second mentioned position thereof.

2. In a cycle, a frame, a front wheel, a fork for said wheel pivotable in said frame, a tire on said wheel, a driving unit supported by said fork pivotally about a horizontal axis parallel to the axis of said wheel, said driving unit including an internal combustion engine and a roller driven by said engine and having its axis fixed with respect thereto so as to cooperate with said tire to drive said wheel for a given position of said unit, and to be out of contact with said tire for another position of said unit, a cylinder and piston unit mounted to form a link between said fork and a part of said driving unit remote from the axis about which said driving unit is pivoted to said fork, an induction pipe for said engine, a throttle in said induction pipe, conduit means for connecting the inside of said cylinder between one end thereof and said piston directly and permanently with said induction pipe downstream of said throttle whereby a sufficiently high suction in the portion of said induction pipe downstream of said throttle will draw said piston toward said end of said cylinder, thus causing said driving unit to pivot into said second mentioned position thereof, and a spring interposed between said piston and said end of said cylinder for urging said two last mentioned parts away from each other, whereby said roller is urged toward said tire.

3. A combination according to claim 2 further including an abutment carried by said end of said cylinder and cooperating with said piston for limiting the pivoting of said driving unit from said first mentioned position to said second mentioned position.

4. A combination according to claim 2 further including means carried by said fork for holding said driving unit in the second mentioned position thereof.

5. A combination according to claim 1 further including a handlebar carried by said fork, a hooked lever pivoted to said handlebar about a horizontal axis, a projection rigid with said driving unit adapted to cooperate with said hooked lever for holding said driving unit above said wheel in the second mentioned position thereof, and a handle rigid with said lever for operation thereof.

6. A combination according to claim 1 further including means for limiting the opening of said throttle when said engine is in the second mentioned position thereof.

7. In a cycle, a frame, a front wheel, a fork for said wheel pivotable in said frame, a tire on said wheel, a driving unit supported by said fork pivotally about a horizontal axis parallel to the axis of said wheel, said driving unit including an internal combustion engine and a roller driven by said engine and having its axis fixed with respect thereto so as to cooperate with said tire to drive said wheel for a given position of said unit, and to be out of contact with said tire for another position of said unit, a cylinder and piston unit mounted to form a link between said fork and a part of said driving unit remote from the axis about which said driving unit is pivoted to said fork, an induction pipe for said engine, a throttle in said induction pipe, conduit means for connecting the inside of said cylinder between one end thereof and said piston directly and permanently with said induction pipe downstream of said throttle whereby a sufficiently high suction in the portion of said induction pipe downstream of said throttle will draw said piston toward said end of said cylinder, thus causing said driving unit to pivot into said second mentioned position thereof, a spring interposed between said piston and said end of said cylinder for urging said two last mentioned parts away from each other, whereby said roller is urged toward said tire, a finger rigid with the axis of said throttle and an abutment carried by said frame for cooperating with said finger when said driving unit is in said second position thereof to limit the opening of said throttle to a predetermined position.

References Cited in the file of this patent

UNITED STATES PATENTS

| | | |
|---|---|---|
| 1,369,015 | Evans | Feb. 22, 1921 |
| 2,081,581 | Fawick | May 25, 1937 |

FOREIGN PATENTS

| | | |
|---|---|---|
| 244,978 | Great Britain | Dec. 31, 1925 |
| 254,974 | Great Britain | July 15, 1926 |